US011255613B2

United States Patent
Fan et al.

(10) Patent No.: US 11,255,613 B2
(45) Date of Patent: Feb. 22, 2022

(54) THERMAL PYROLYTIC GRAPHITE TUBE DEVICE FOR DIRECTIONAL THERMAL MANAGEMENT

(71) Applicant: Momentive Performance Materials Quartz, Inc., Strongsville, OH (US)

(72) Inventors: Wei Fan, Strongsville, OH (US); Creighton Tomek, Cleveland, OH (US); Gregory Shaffer, Strongsville, OH (US)

(73) Assignee: Momentive Performance Materials Quartz, Inc., Strongsville, OH (US)

( * ) Notice: Subject to any disclaimer, the term of this patent is extended or adjusted under 35 U.S.C. 154(b) by 54 days.

(21) Appl. No.: 16/099,003

(22) PCT Filed: May 10, 2017

(86) PCT No.: PCT/US2017/031882
§ 371 (c)(1),
(2) Date: Nov. 5, 2018

(87) PCT Pub. No.: WO2017/196925
PCT Pub. Date: Nov. 16, 2017

(65) Prior Publication Data
US 2019/0154360 A1  May 23, 2019

Related U.S. Application Data

(60) Provisional application No. 62/333,933, filed on May 10, 2016.

(51) Int. Cl.
*F28F 1/04*    (2006.01)
*F28F 13/18*   (2006.01)
(Continued)

(52) U.S. Cl.
CPC .............. *F28F 1/045* (2013.01); *F16L 9/003* (2013.01); *F16L 9/14* (2013.01); *F28F 1/003* (2013.01);
(Continued)

(58) Field of Classification Search
CPC combination set(s) only.
See application file for complete search history.

(56) References Cited

U.S. PATENT DOCUMENTS

| 3,537,485 A | 11/1970 | March |
| 4,247,381 A | 1/1981 | Schirnig et al. |

(Continued)

FOREIGN PATENT DOCUMENTS

| EP | 0582835 | 2/1994 |
| JP | 2014129890 | 7/2014 |

(Continued)

OTHER PUBLICATIONS

Patent Cooperation Treaty (PCT), International Search Report and Written Opinion for Application PCT/US2017/031882 filed May 10, 2017, dated Aug. 28, 2017, International Searching Authority, US.

*Primary Examiner* — Anthony J Frost
(74) *Attorney, Agent, or Firm* — McDonald Hopkins LLC (57) ABSTRACT

The present technology provides a non-cylindrical structure for transporting media, including gases, liquids, solids, or energy comprising a layer of thermal pyrolytic graphite (TPG) surrounded by an outer layer and an inner layer comprising a metal, a ceramic, a glass, or a plastic. In particular, the present technology relates to a non-cylindrical tube or a pipe having an inner layer, an outer layer, and a layer of TPG between the inner layer and the outer layer wherein the TPG layer is configured to manage the direction of heat conduction.

15 Claims, 5 Drawing Sheets

(51) Int. Cl.
*F28F 21/02* (2006.01)
*F28F 1/00* (2006.01)
*F16L 9/14* (2006.01)
*F16L 9/00* (2006.01)
*F28F 21/00* (2006.01)
*F16L 9/10* (2006.01)
*F28F 21/08* (2006.01)
*F16L 9/02* (2006.01)
*F28F 21/06* (2006.01)
*F28F 13/14* (2006.01)
*F16L 9/12* (2006.01)
*F28F 13/00* (2006.01)

(52) U.S. Cl.
CPC ............... *F28F 1/04* (2013.01); *F28F 13/18* (2013.01); *F28F 21/02* (2013.01); *F16L 9/02* (2013.01); *F16L 9/10* (2013.01); *F16L 9/12* (2013.01); *F28F 13/14* (2013.01); *F28F 21/006* (2013.01); *F28F 21/06* (2013.01); *F28F 21/08* (2013.01); *F28F 2013/001* (2013.01); *F28F 2255/06* (2013.01)

(56) References Cited

U.S. PATENT DOCUMENTS

| | | |
|---|---|---|
| 2002/0034381 A1 | 3/2002 | Luo |
| 2008/0019097 A1* | 1/2008 | Zhang ............... H01L 23/3733 361/704 |
| 2008/0066676 A1 | 3/2008 | Mariner et al. |
| 2009/0308481 A1* | 12/2009 | Xiao ..................... F16L 9/02 138/142 |
| 2010/0326645 A1* | 12/2010 | Fan ..................... H01L 23/3677 165/185 |
| 2012/0087457 A1* | 4/2012 | Garnier ............... C04B 35/571 376/416 |
| 2012/0202045 A1* | 8/2012 | Mutsuda ............... F01N 13/14 428/318.4 |
| 2012/0234524 A1 | 9/2012 | Wei et al. |
| 2016/0049211 A1 | 2/2016 | Feinroth et al. |

FOREIGN PATENT DOCUMENTS

| | | |
|---|---|---|
| JP | 2014515876 | 7/2014 |
| WO | 2011087371 | 7/2011 |
| WO | 2011087381 A1 | 7/2011 |

* cited by examiner

TABLE 1

| | #1 | #2 | #3 | #4 |
|---|---|---|---|---|
| Configuration |  |  |  |  |
| $k_x$ (W/m-K) | 714 | 16 | 16 | 714 |
| $k_y$ (W/m-K) | 714 | 16 | 714 | 714 |
| $k_z$ (W/m-K) | 1060 | 1060 | 1060 | 166 |
| Conduction Direction | x, y, & z | z | y & z | x & y |
| Insulation Direction | | x & y | x | z |

Fig. 7

THERMAL PYROLYTIC GRAPHITE TUBE DEVICE FOR DIRECTIONAL THERMAL MANAGEMENT

CROSS REFERENCE TO RELATED APPLICATIONS

The present application claims priority to International Patent Application No. PCT/US2017/031882, filed on Nov. 10, 2017, which claims priority to U.S. Provisional Patent Application No. 62/333,933, entitled "Thermal Pyrolytic Graphite Tube Device for Directional Thermal Management," filed on May 10, 2016, which are incorporated herein by reference in their entirety.

FIELD

The present technology relates to a non-cylindrical structure for transporting media, including gases, liquids, solids, or energy comprising a layer of thermal pyrolytic graphite (TPG) surrounded by an outer layer and an inner layer comprising a metal, a ceramic, a glass, or a plastic. In particular, the present technology relates to a non-cylindrical tube or a pipe having an inner layer, an outer layer, and a layer of TPG between the inner layer and the outer layer.

BACKGROUND

Tubes or pipes are commonly used for transporting mass (e.g., gases, liquids, solids) and energy (e.g., electromagnetic waves, light, acoustic waves). Management of heat between the media within the tube and the features surrounding the tube (e.g., devices or other structures adjacent to the tube) is often required. Typical tubes or pipes for transporting such media are made of metals, ceramics, glasses, or plastics. These materials exhibit isotropic thermal properties so that heats flow with the same conduction power through the tube wall thickness and along the tube axis. Metals or alloys are a popular choice over ceramics, glasses, or plastics due to their relatively high thermal conductivity (e.g., up to 400 W/m-K for copper).

High thermal conductivity of the tube wall material is generally desired for applications in heat exchangers. Current materials for tubes cannot deliver high thermal conductivity and this lack of high thermal conductive material may limit the amount of mass or energy passing through a tube due to excessive heat generation.

There are also occasions where the thermal conductivity required for a certain direction is lower than the typical thermal conductivity so that devices adjacent to the tube are isolated from the heat, while heat flow in the remaining directions is unconstrained. Regular metal, ceramic, glass, or plastic tubes cannot deliver high and/or directional thermal conduction. Thus, there remains a need for tubes or pipes made of materials that can deliver high and/or directional thermal conduction.

SUMMARY

The present technology provides, in one aspect, a non-cylindrical structure for transporting media including, but not limited to, gases, liquids, solids, or energy, the structure comprising (i) a thermally conductive layer comprising thermal pyrolytic graphite (TPG) surrounded by (ii) an outer layer, and (iii) an inner layer, the inner and outer layer comprising a metal, a ceramic, a glass, or a plastic. Other forms of bulk graphene may be used in the thermally conductive layer including materials such as pyrolytic graphite ("PG"), highly oriented pyrolytic graphite ("HOPG"), and compression annealed pyrolytic graphite ("CAPG") may be used.

In one aspect of the invention, the structure is a generally rectangular structure such as a tube or a pipe comprising a layer of TPG surrounded by an outer layer and an inner layer of a metal, a ceramic, a glass, or a plastic.

In one embodiment the inner layer and the outer layer are independently selected from a metal, a ceramic, a glass, or a plastic. In one embodiment, the outer layer and the inner layer comprise the same material.

Examples of suitable metals for the inner layer and the outer layer include, but are not limited to, copper, aluminum, tungsten, molybdenum, tantalum, zinc, nickel, iron, tin, silver, gold, beryllium, or an alloy of two or more thereof. Examples of suitable ceramics include, but are not limited to, silicon nitride, silicon carbide, silicon oxide, aluminum nitride, aluminum oxide, beryllium oxide, boron nitride, zirconium oxide, or a ceramic mixture of two or more thereof. Examples of suitable glasses include, but are not limited to silica, alkali, halide, alumina, or a glass mixture of two or more thereof. Examples of suitable plastics include, but are not limited to, nylons, polycarbonates, and high temperature resins. Suitable nylons include nylon 6, nylon 66, nylon 6T, nylon 12, nylon 46, and the like. Suitable high temperature resins include polyetheretherketone (PEEK), polyphenylene sulfide, polythalamide, liquid crystalline polymer (LCP), polyamideimide, polyimdes, polyphthalamide, polyaryletheretherketones, polyaryletherketone, polyetherimide, and the like.

In one aspect of the invention, the TPG is configured to achieve directional heat flow such that heat conduction varies along the tube. In one embodiment, the configuration provides for heat conduction in the x direction, the y direction, the z direction, the x and y direction, the y and z direction, the x and z direction, or the x, y, and z direction.

In one embodiment of the invention, the structure is a rectangular tube structure with TPG basal planes parallel to the center tube axis and perpendicular to each tube side surface.

In another embodiment, the structure is a rectangular tube structure with TPG basal planes parallel to the center tube axis and parallel to each tube side surface.

In another embodiment, the structure is a rectangular tube structure with TPG basal planes parallel to the center tube axis and perpendicular to one pair of the tube side surfaces.

In another embodiment, the structure is a rectangular tube structure with TPG basal planes perpendicular to the center tube axis.

In one aspect, the present invention provides a method of transporting a fluid by passing a fluid through a tubular structure according to any previous aspect or embodiment.

In one aspect, the present invention provides, a non-cylindrical tubular structure comprising (i) an inner layer defining a core lumen, (ii) an outer layer, and (iii) a thermally conductive layer disposed between the inner layer and the outer layer, the inner and outer layer individually comprising a metal, a ceramic, a glass, or a plastic, and the thermally conductive layer comprising a thermally conductive material.

In one embodiment, the thermally conductive material is chosen from a bulk graphene material chosen from thermal pyrolytic graphite (TPG), pyrolytic graphite (PG), highly oriented pyrolytic graphite (HOPG), and/or compression annealed pyrolytic graphite ("CAPG").

In one embodiment, the bulk graphene (e.g., the TPG) is oriented to control the direction of heat conduction.

In one embodiment according to any of the previous embodiments, the structure comprises a center tube axis, wherein the TPG layer comprises a plurality of TPG sheets, wherein the TPG sheets are oriented parallel to the center tube axis and parallel to each other.

In one embodiment according to any of the previous embodiments, the structure comprises a center tube axis, wherein the TPG layer comprises a plurality of TPG sheets, wherein the TPG sheets are oriented perpendicular to the center tube axis and parallel to each other.

In one embodiment according to any of the previous embodiments, the structure comprises a center tube axis, wherein the TPG layer comprises a plurality of TPG sheets, and wherein the plurality of the TPG sheets are oriented parallel to the center tube axis and parallel to each other, and the plurality of the TPG sheets are oriented perpendicular to at least one tube side surface.

In one embodiment according to any of the previous embodiments, the structure comprises a center tube axis, wherein the TPG layer comprises a plurality of TPG sheets, and wherein the plurality of the TPG sheets are oriented parallel to the center tube axis and parallel to each other, and the plurality of the TPG sheets are oriented parallel to at least one tube side surface.

In one embodiment according to any of the previous embodiments, the inner layer and the outer layer each comprise a metal chosen from copper, aluminum, tungsten, molybdenum, nickel, iron, tin, silver, gold, beryllium, titanium, zirconium, or an alloy of two or more thereof.

In one embodiment according to any of the previous embodiments, the non-cylindrical tubular structure comprises three or more sides.

In one embodiment according to any of the previous embodiments, the shape of the tubular structure is generally rectangular.

In another aspect, the present invention provides a method of transporting a material comprising passing a material through the non-cylindrical tubular structure of any of the previous embodiments.

In still another aspect, the present invention provides a method of forming a non-cylindrical tubular structure comprising: (a) forming a structure of a thermally conductive material defining a channel through an interior of the structure; (b) disposing an inner layer defining a core lumen within the channel; and (c) covering the structure with an outer layer.

In one embodiment, forming the structure of a thermally conductive material and disposing an inner layer within the core lumen comprises: (i) providing one or more thermally conductive sheets to form a structure, each sheet defining a plurality of basal planes; (ii) forming a channel in the structure; (iii) disposing an inner layer within the channel, the inner layer defining a core lumen; and (iv) disposing a thermally conductive sheet defining a plurality of basal planes above the inner layer.

In one embodiment the method comprises (v) covering the structure of (iv) with an outer layer.

In one embodiment of the method, (i) comprises providing a first thermally conductive sheet, a second thermally conductive sheet, and a third thermally conductive sheet, and (ii) comprises bonding the sheets such that the second sheet is disposed between the first and third sheets.

In one embodiment, the basal planes of the second sheet are oriented in a different direction than those of the first and second sheets.

In one embodiment, the thermally conductive sheet of (iv) is disposed within the structure such that its basal planes are oriented in the same direction as the basal planes of the rest of the structure.

In one embodiment, the thermally conductive sheet of (iv) is disposed within the structure such that its basal planes are oriented in the same direction as the basal planes of the second sheet.

In one embodiment, operation (a) comprises forming a thermally conductive material by chemical vapor deposition about a mandrel having a shape of the core lumen.

In one embodiment of the method according any of the previous embodiments, the inner layer and the outer layer each comprise a metal chosen from copper, aluminum, tungsten, molybdenum, nickel, iron, tin, silver, gold, beryllium, titanium, zirconium, or an alloy of two or more thereof.

In one aspect, the present invention provides, a generally rectangular tubular structure comprising: an inner layer defining a core lumen; an outer layer; a center tube axis along the length of the structure; tube side surfaces, tube top surfaces, and tube bottom surfaces defined by the outer layer; and a thermally conductive layer comprising thermal pyrolytic graphite (TPG), wherein the TPG comprises a plurality of TPG sheets, each sheet having a plurality of basal planes, wherein the TPG basal planes of the respective sheets are oriented parallel to, perpendicular to, or at an angle to the center tube axis and parallel to, perpendicular to, or at an angle relative to a side surface.

In one embodiment, the TPG basal planes are parallel to the center tube axis and parallel to each tube side surface, and perpendicular to the tube top surface and the tube bottom surface.

In one embodiment, the TPG basal planes are parallel to the center tube axis and perpendicular to one pair of the tube side surfaces.

the TPG basal planes are parallel to the center tube axis and parallel to each tube side surface, and parallel to the tube top surface and the tube bottom surface.

In one embodiment, the TPG basal planes are perpendicular to the center tube axis.

In one embodiment, the TPG basal planes are parallel to each other.

In one embodiment, the thermally conductive layer is formed from: a first sheet defining a side wall, a portion of a top wall, and a portion of a bottom wall; a second sheet opposite the first sheet, the second sheet defining a side wall, a portion of the top wall, and a portion of the bottom wall; a third sheet disposed in between the first and the second sheet, the third sheet defining a portion of the bottom wall; and a fourth sheet opposite the third sheet and disposed between the first sheet and the second sheet, with the center tube being disposed between the first, second, third, and fourth sheets.

In one embodiment, the basal planes of the first sheet and the second sheet are oriented in the same direction, and the basal planes of the third sheet and the fourth sheet are oriented in a direction different from that of the first and second sheets.

In one embodiment, the basal planes of the first and second sheet are oriented perpendicular to the center tube axis.

In one embodiment, the basal planes of the first and second sheet are oriented parallel to the center tube axis.

In one embodiment, the basal planes of the first sheet, the second sheet, the third sheet, and the fourth sheet are oriented in the same direction.

BRIEF DESCRIPTION OF THE DRAWINGS

FIG. 5(a)-(f) depicts operations for forming a non-cylindrical structure in accordance with one embodiment.

The drawings are not to scale unless otherwise noted. The drawings are for the purpose of illustrating aspects and embodiments of the present technology and are not intended to limit the technology to those aspects illustrated therein. Aspects and embodiments of the present technology can be further understood with reference to the following detailed description.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The current invention discloses a non-cylindrical structure for transporting media, including, for example, gases, liquids, solids, or energy. The structure comprises (i) a thermally conductive layer comprising thermal pyrolytic graphite (TPG) surrounded by (ii) an outer layer and (iii) an inner layer, the outer and inner layer comprising a metal, a ceramic, a glass, or a plastic, the inner layer defining a core lumen (e.g., tube) through which media may pass. It should be understood that other forms of bulk graphene including materials such as pyrolytic graphite ("PG"), highly oriented pyrolytic graphite ("HOPG"), and compression annealed pyrolytic graphite ("CAPG") may be used in place of TPG. The description of the "TPG layer" also applies to a layer comprising other bulk graphenes including "PG," "HOPG," and "CAPG."

In one aspect of the invention, the non-cylindrical structure is a tube or pipe structure containing an inner layer, an outer layer, and TPG disposed between the two layers. TPG provides the structure with directional thermal conductivity, and the inner and outer layers provide protection and/or mechanical strength and may also comprise a thermally conductive material. The non-cylindrical tube or pipe can be of any size as desired for a particular purpose or intended application. The non-cylindrical tube structure may be a non-cylindrical polygon comprising 3 or more sides. In one embodiment, the non-cylindrical polygonal structure comprises 3, 4, 5, 6, 7, 8, 9, or 10 or more sides. In one embodiment, the non-cylindrical polygon comprises 3-6 sides. The non-cylindrical polygon can be a regular non-cylindrical polygon having sides of the same dimensions. In another embodiment, the non-cylindrical polygon can be a non-regular polygon having at least two sides of different dimensions. The non-cylindrical tube may be formed into any non-cylindrical polygonal shape as may be desired. In one embodiment, the tube or pipe is generally rectangular in shape. In one embodiment, the tube or pipe is generally square in shape.

In one aspect, the inner layer and the outer layer are independently selected from a metal, a ceramic, a glass, or a plastic. In one embodiment, the outer layer and the inner layer comprise the same material. In another embodiment, the outer layer and the inner layer may comprise different materials.

Examples of suitable metals for the inner layer and the outer layer include, but are not limited to, copper, aluminum, tungsten, molybdenum, nickel, iron, tin, silver, gold, beryllium, titanium, zirconium, or an alloy of two or more thereof. Examples of suitable ceramics include, but are not limited to, nitrides, oxides, carbides, carbonitride, or oxynitrides of elements selected from B, Al, Si, Ga, refractory hard metals, transition metals, rare earth metals, or complexes and/or combinations of two or more thereof. In one embodiment, the ceramic material is chosen from silicon nitride, silicon carbide, silicon oxide, aluminum nitride, aluminum oxide, beryllium oxide, boron nitride, zirconium oxide, or a ceramic mixture of two or more thereof. Examples of suitable glasses include, but are not limited to silica, alkali, halide, alumina, or a glass mixture of two or more thereof. Examples of suitable plastics include, but are not limited to, nylons, polycarbonates, and high temperature resins. Suitable nylons include nylon 6, nylon 66, nylon 6T, nylon 12, nylon 46, and the like. Suitable high temperature resins include polyetheretherketone (PEEK), polyphenylene sulfide, polythalamide, liquid crystalline polymer (LCP), polyamideimide, polyimdes, polyphthalamide, polyaryletheretherketones, polyaryletherketone, polyetherimide, and the like.

In one embodiment, the TPG (or other bulk graphene) may also refer to graphite materials having crystallites of considerable size, the crystallites being highly aligned or oriented with respect to each other and having well ordered carbon layers or a high degree of preferred crystallite orientation. TPG material mostly comprises carbon atoms arranged in hexagonal patterns within each plane.

TPG, with its metal encapsulated composites (e.g., TC1050® available from Momentive Performance Materials), is an advanced thermal management material serving various industries for over two decades. TPG is formed via a two-step process that provides well-aligned graphene planes to provide a material with superior thermal conductivity (e.g., greater than 1500 W/m-K). Compared to copper, which is commonly used in passive cooling and most thermal conductive among all the materials mentioned above, TPG can provide four times the cooling power at ¼th the weight of copper.

The TPG layer may be formed from a plurality of TPG sheets. In one embodiment, the TPG sheets may be parallel to each other at an angle of at most 1 degree per mm in thickness. In one embodiment, a TPG sheet comprises at least 3000 graphene layers, the graphene layers being parallel to each other at an angle of at most 1 degree per mm in thickness. In one embodiment, the layers are at an angle between 0.001 degree and 1 degree per mm in thickness.

The dimensions of the TPG layer may be chosen as desired for a particular purpose or intended application. The TPG layer exhibits high thermal conductivity, usually higher than 1000 W/m-K. In one embodiment, the TPG layer has an in-plane (a-b direction) thermal conductivity greater than 1000 W/m-K; greater than 1100 W/m-K; greater than 1200 W/m-K; even greater than 1500 W/m-K. In one embodiment, the TPG or other bulk graphene layer has a thermal conductivity of from about 1000 W/m-K to about 1800 W/m-K; from about 1100 W/m-K to about 1700 W/m-K; even from about 1200 W/m-K to about 1500 W/m-K. The TPG layer (and the tube overall) may also exhibit excellent through-plane thermal conductivity. In one embodiment, the TPG layer and/or tube has a thermal conductivity of from about 200 W/m-K to about 1400 W/m-K; from about 400 W/m-K to about 1000 W/m-K; even from about 500 W/m-K to about 800 W/m-K. Here as elsewhere in the specification and claims, numerical values can be combined to form new and non-disclosed ranges.

The TPG can be provided in any suitable form. In one embodiment, the TPG is provided as a sheet. The TPG layer can have any size or thickness as desired for a particular purpose or intended use. The TPG layer may have a thickness of about 1.0 mm, about 1.5 mm, about 2.0 mm, about 2.5 mm, or even about 3 mm. The TPG layer may have a thickness of from about 0.1 mm to about 25.0 mm; from about 0.5 mm to about 10 mm; from about 1 mm to about 5 mm; or from about 2 mm to about 3 mm.

TPG exhibits anisotropic thermal conductivity such that within the basal plane is ~1600 W/m-K (4× of copper) and perpendicular to the plane is ~10 W/m-K (⅟₄₀ of copper). Embedding TPG inside a tube wall can simultaneously achieve both high and low thermal conductivity in a desired configuration. Also TPG has a density of 2.25 g/cm$^3$, which is ¼ of copper's weight. Thus, incorporating TPG can also significantly reduce the overall weight of the tube.

The thicknesses of the inner and outer layers of the tube structures may be chosen as desired for a particular purpose or intended application. In one embodiment, the inner layer and the outer layer may independently have a thickness of about 0.1 mm, about 0.5 mm, about 1.0 mm, about 1.5 mm, or about 2.0 mm. The inner layer and the outer layer may independently have a thickness of from about 0.001 mm to about 50 mm, 0.1 mm to about 25 mm; from about 0.5 mm to about 10 mm, from about 1.0 mm to about 5 mm; even from about 2 to about 3 mm. It will be appreciated that the thickness of the inner layer and the outer layer may be the same as or different from one another. Here as elsewhere in the specification and claims, numerical values may be combined to form new and unspecified ranges.

The TPG layer may be configured to provide directional heat flow such that heat conduction varies along the tube. The directional heat flow may be managed by the manner in which the TPG is oriented in the tube. FIGS. 1-4 illustrate non-limiting embodiments of possible configurations of the TPG within the tube. All of the configurations depicted in FIGS. 1-4 provide for selected directional thermal management. In one embodiment, the configuration provides for heat conduction in the x direction; in the y direction; in the z direction; in both the x and y direction; in both the y and z direction; in both the x and z direction; or in each of the x, y, and z directions.

Figure 1:
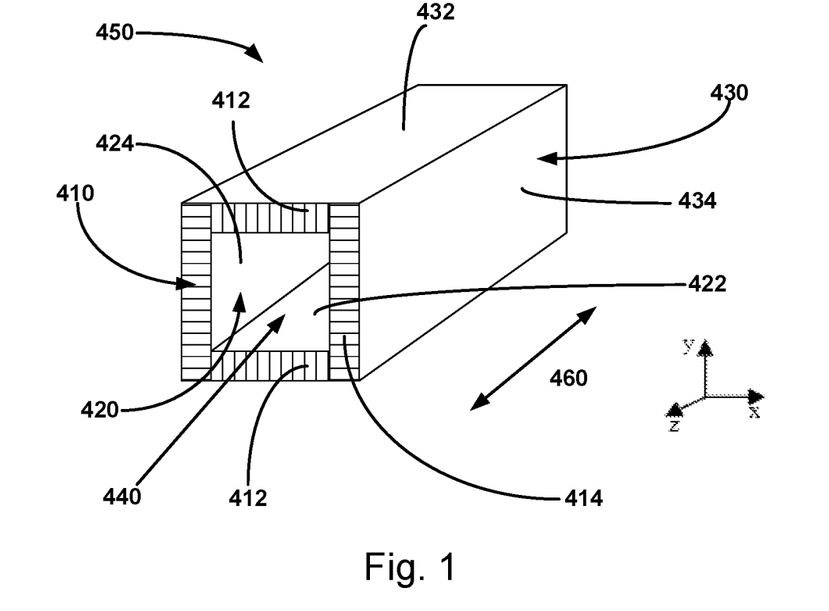
FIG. 1 depicts a generally rectangular tube comprising an inner layer, an outer layer, and a TPG layer that is between the inner layer and the outer layer with TPG basal planes parallel to the center tube axis and perpendicular to each tube side surface. The inner layer defines a core lumen through which media may flow.

In one embodiment of the invention, the structure is a rectangular tube structure 450 with TPG basal planes parallel to the center tube axis 460 and perpendicular to each tube side surface (FIG. 1). Tube 450 is a generally rectangular tube having a layer of TPG 410 between an inner layer 420 and an outer layer 430. Inner layer 420 is defined by top and bottom walls 422 and side walls 424. Outer layer 430 is defined by top and bottom walls 432 and side walls 434. The TPG layer 410 comprises a plurality of TPG sheets. TPG sheets 412 are positioned such that the TPG basal planes are oriented perpendicular to the plane of walls 422 of inner layer 420 and TPG sheets 414 are positioned such that the TPG basal planes are oriented perpendicular to the plane of walls 434 of the outer layer. The inner layer 420 defines a core lumen 440 through which a media may pass. The inner layer 420 and the outer layer 430 each comprise a metal, a ceramic, a glass, or a plastic. In this configuration, heat conduction occurs in the x, y, and z directions.

Figure 2:
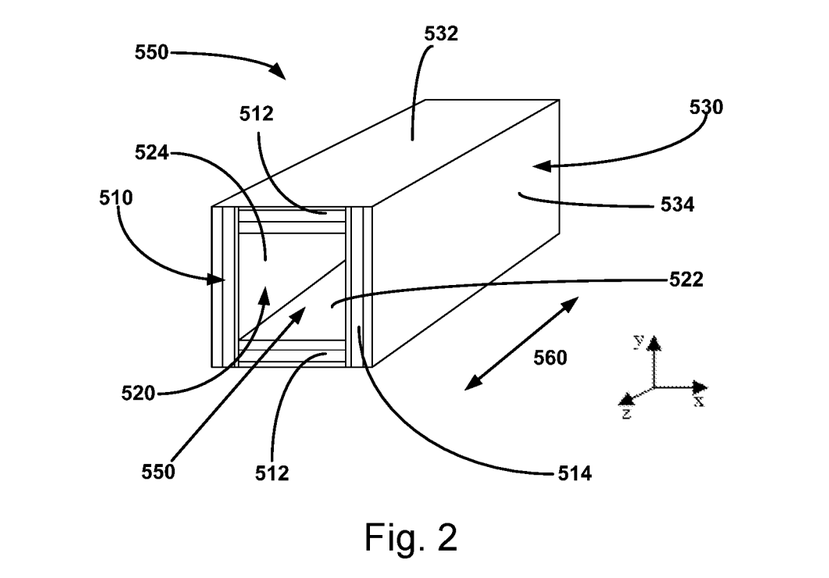
FIG. 2 depicts a generally rectangular tube comprising an inner layer, an outer layer, and a TPG layer that is between the inner layer and the outer layer with TPG basal planes parallel to the center tube axis and parallel to each tube side surface. The inner layer defines a core lumen through which media may flow.

In one embodiment of the invention, the structure is a rectangular tube structure 550 with TPG basal planes parallel to the center tube axis 560 and parallel to each tube side surface (FIG. 2). Tube 550 is a generally rectangular tube having a layer of TPG 510 between an inner layer 520 and an outer layer 530. Inner layer 520 is defined by top and bottom walls 522 and side walls 524. Outer layer 530 is defined by top and bottom walls 532 and side walls 534. The TPG layer 510 comprises a plurality of TPG sheets. TPG sheets 512 are positioned such that the TPG basal planes are oriented parallel to the plane of walls 522 of inner layer 520 and TPG sheets 514 are positioned such that the TPG basal planes are oriented parallel to the plane of walls 534 of the outer layer. The inner layer 520 defines a core lumen 540 through which a media may pass. The inner layer 520 and the outer layer 530 each comprise a metal, a ceramic, a glass, or a plastic. In this configuration, heat conduction occurs in the z direction and insulation occurs in the x and y directions.

Figure 3:
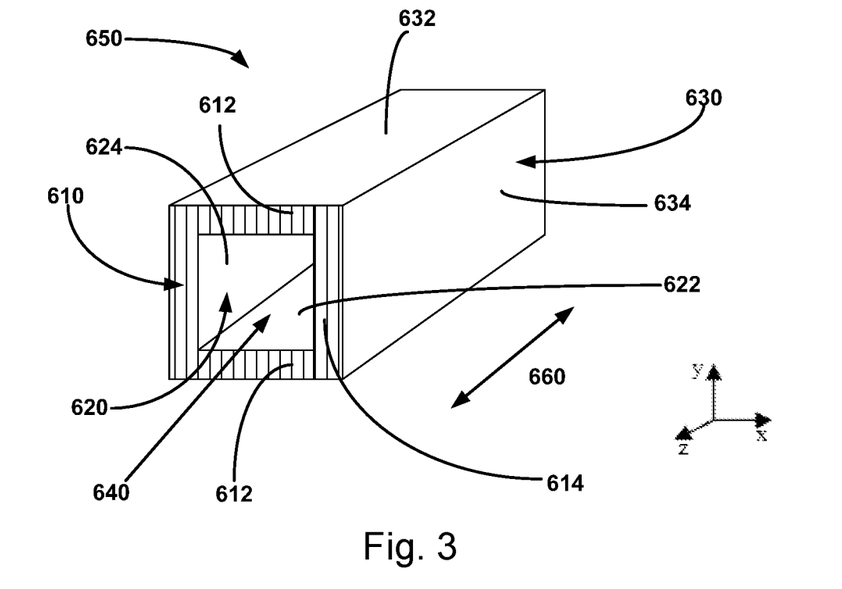
FIG. 3 depicts a generally rectangular tube comprising an inner layer, an outer layer, and a TPG layer that is between the inner layer and the outer layer with TPG basal planes parallel to the center tube axis and perpendicular to one pair of the tube side surfaces. The inner layer defines a core lumen through which media may flow.

In one embodiment of the invention, the structure is a rectangular tube structure 650 with TPG basal planes parallel to the center tube axis 660 and perpendicular to one pair of the tube side surfaces (FIG. 3). Tube 650 is a generally rectangular tube having a layer of TPG 610 between an inner layer 620 and an outer layer 630. Inner layer 620 is defined by top and bottom walls 622 and side walls 624. Outer layer 630 is defined by top and bottom walls 632 and side walls 634. The TPG layer 610 comprises a plurality of TPG sheets. TPG sheets 612 are positioned such that the TPG basal planes are oriented perpendicular to the plane of walls 622 of inner layer 620 and TPG sheets 614 are positioned such that the TPG basal planes are oriented parallel to the plane of walls 634 of the outer layer. The inner layer 620 defines a core lumen 640 through which a media may pass. The inner layer 620 and the outer layer 630 each comprise a metal, a ceramic, a glass, or a plastic. In this configuration, heat conduction occurs in the y and z directions and insulation occurs in the x direction.

Figure 4:
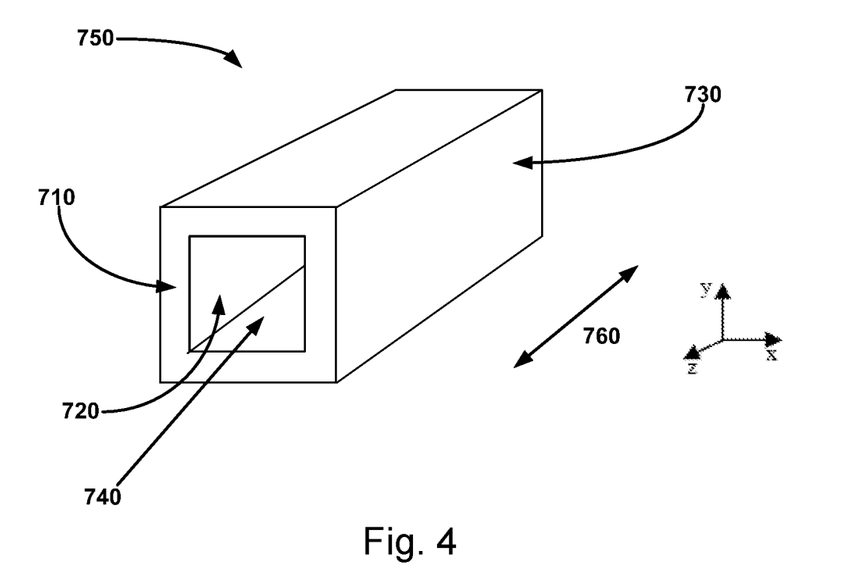
FIG. 4 depicts a generally rectangular tube comprising an inner layer, an outer layer, and a TPG layer that is between the inner layer and the outer layer with TPG basal planes perpendicular to the center tube axis. The inner layer defines a core lumen through which media may flow.

In one embodiment of the invention, the structure is a rectangular tube structure 750 with TPG basal planes perpendicular to the center tube axis 760 (FIG. 4). Tube 750 is a generally rectangular tube having a layer of TPG 710 between an inner layer 720 and an outer layer 730. The TPG layer 710 comprises one or a plurality of TPG sheets. The inner layer 720 defines a core lumen 740 through which a media may pass. The inner layer 720 and the outer layer 730 each comprise a metal, a ceramic, a glass, or a plastic. In this configuration, heat conduction occurs in the x and y directions and insulation occurs in the z direction.

As illustrated in FIGS. 1-2, the tubular structures may be such that there may be different orientations of the basal planes of the graphite thermally conductive material relative to the top and bottom surfaces. In FIG. 1, the basal planes of the sheet forming the side walls 424 are oriented perpendicular to the surface of the outer side walls 434. The walls 422 are oriented perpendicular to the upper surface of the core lumen 440. As such, there is a section of thermally conductive material (defined by walls 422) adjacent the top surface and the bottom surface where the basal planes are oriented perpendicular to the top and bottom walls 432, and there are sections of thermally conductive material (defined by the side walls 422) where the basal planes of the thermally conductive material are oriented parallel to the surface of the top and bottom walls. The reverse scenario is illustrated in FIG. 2. In FIG. 3, the tubular structure is configured such that the basal planes of the thermally conductive material are oriented perpendicular to the top and bottom surface of the outer layer substantially all along the planes of those surfaces. While not illustrated, a structure could be configured to provide the basal planes in an orientation parallel to substantially all of the top surface and the bottom surface.

The thermally conductive structures may be formed by any suitable method. In one aspect, the method comprises (a) forming a thermally conductive layer defining a channel or through way through an interior of the structure; (b) disposing an inner layer within the channel, the inner layer defining a core lumen; and (c) covering the structure with an outer layer. Forming the overall structure may be completed in different ways. In particular, forming the inner thermally conductive layer may be formed in a number of ways. The following describes examples of forming the thermally conductive layer and the overall structure.

In one embodiment of the method, operations (a) and (b) may be carried out by: (i) providing one or more thermally conductive sheets to provide a structure, (ii) forming a center through way through one or more of the sheets, (iii) placing an inner layer material defining a core lumen in the through way of the thermally conductive sheets, and (iv) attaching a thermally conductive top piece over the top of the inner layer. Operation (c) may be carried out by surrounding the structure with an outer layer to form the completed structure. The number of thermally conductive sheets employed may be selected as desired for a particular purpose or intended application. In one embodiment, a single sheet is used. Employing a single sheet will result in the side walls and bottom walls having the graphene basal planes oriented in the same direction. The thermally conductive layer placed over the top of the inner layer may be placed so as to orient the graphene planes in the same direction as the rest of the structure, or in a different direction. In one embodiment, the structure may be formed using a plurality of thermally conductive sheets. In one embodiment, the structure may be formed using 2, 3, or more sheets. The sheets are oriented such that the basal planes of the sheet will be in a desired direction in the final structure.

Figure 5:
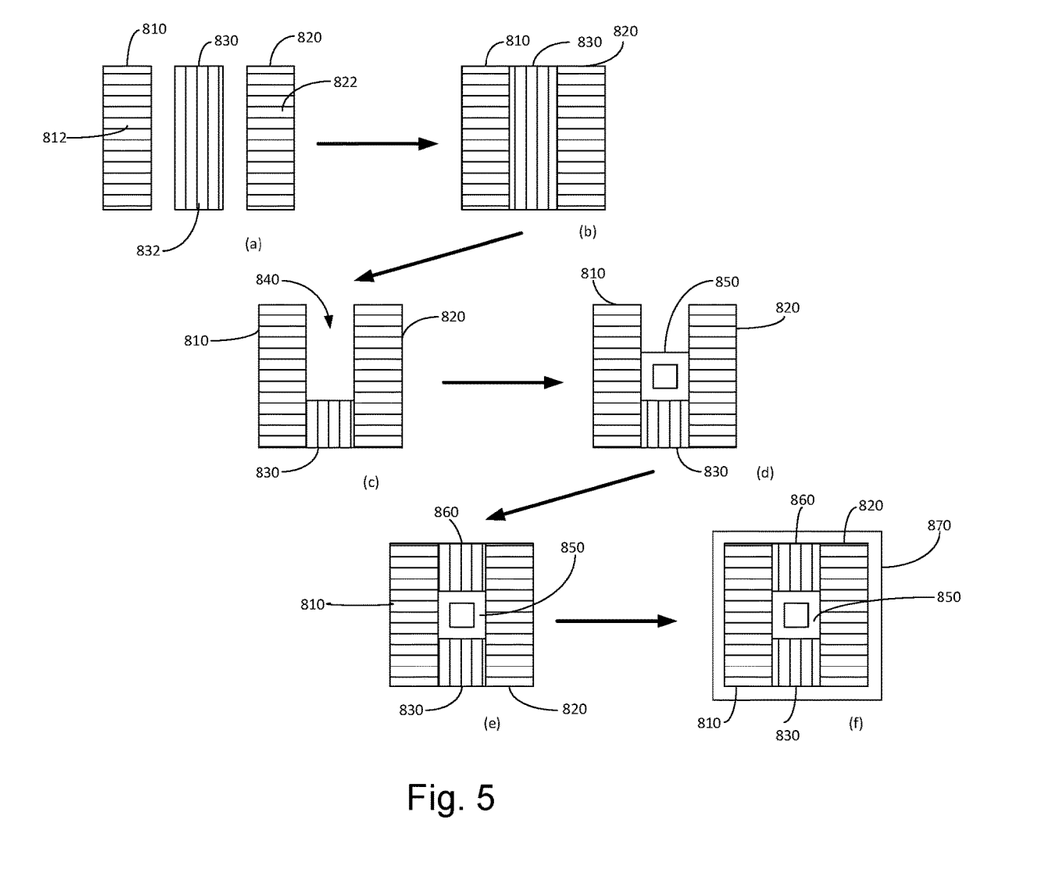

For example, referring to FIG. 5, a tubular structure may be formed by (a) providing a first thermally conductive sheet 810 with the basal planes 812 of the graphene material oriented horizontally, a second sheet 830 with the basal planes 832 oriented vertically, and a third sheet 820 positioned such that the basal planes 822 are oriented horizontally. In operation (b), the sheets are bonded together to form a single structure. In operation (c), a channel or through way 840 is formed in the structure. In operation (d), an inner layer 850 is then disposed in the channel. In operation (e), another sheet 860 of thermally conductive material is disposed over the inner layer. In FIG. 5, the sheet 860 is shown such that the basal planes are oriented vertically. Subsequently, in operation (f), an outer layer 870 is disposed about the thermally conductive layer to form the structure.

In another example, the tubular structure may be formed by (i) providing one thermally conductive sheets to form a structure, each sheet defining a plurality of basal planes. In operation (ii), a channel in the structure is formed in the structure. In operation (iii), an inner layer is then disposed in the channel, the inner layer defining a core lumen. In operation (iv), another thermally conductive sheet is disposed over the inner layer. Subsequently, in operation (v), an outer layer is disposed above the thermally conductive layer to form the structure.

The channel or through way may be formed in the thermally conductive layer in any suitable manner. In one embodiment, the channel or through way may be formed by machining out portions of the thermally conductive sheets to define a shaped through way.

Figure 6:
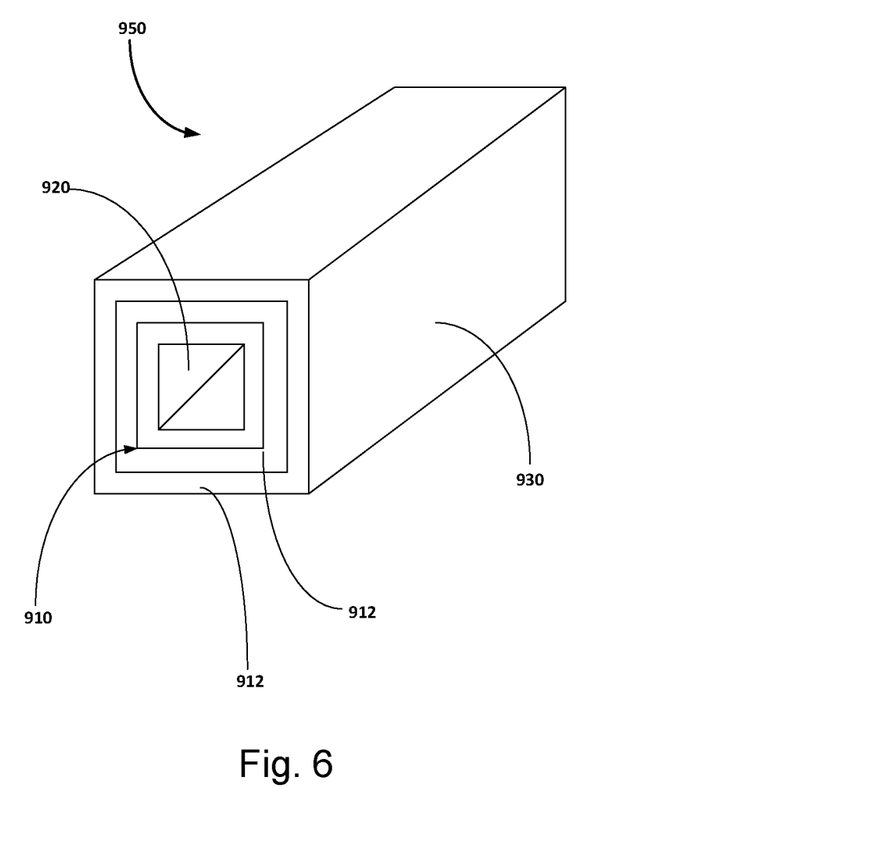
FIG. 6 depicts a generally rectangular tube formed in accordance with a method of one embodiment.

In another embodiment, the center thermally conductive layer is formed in operation (a) in a chemical vapor deposition process using a rod mandrel with the shape of the core lumen. The rod mandrel is subsequently removed leaving the thermally conductive layer with the open channel or through way and all basal planes parallel to the center tube axis. In operation (b), an inner layer defining a core lumen is then disposed in the channel/through way defined by the thermally conductive layer. Subsequently, in operation (c), an outer layer is disposed above the thermally conductive layer to form the structure. In this embodiment, all sides of the TPG tubular structure will be seamlessly joined together without the need of bonding multiple TPG blocks. FIG. 6 depicts a generally rectangular tube formed using chemical vapor deposition. The tube 950 comprises an inner layer 920, an outer layer 930, and a TPG layer 910 that is between the inner layer and the outer layer with TPG basal planes 912 parallel to the center tube axis and parallel to each tube side surface. The inner layer defines a core lumen through which media may flow. The TPG layer is formed as a single tubular piece through chemical vapor deposition that uses a rod mandrel with the shape of the center lumen. The mandrel is then removed afterward, leaving an open channel.

The methods allow for forming a structure having the basal planes of the thermally conductive layer oriented in a direction as desired.

EXAMPLES

Figure 7:
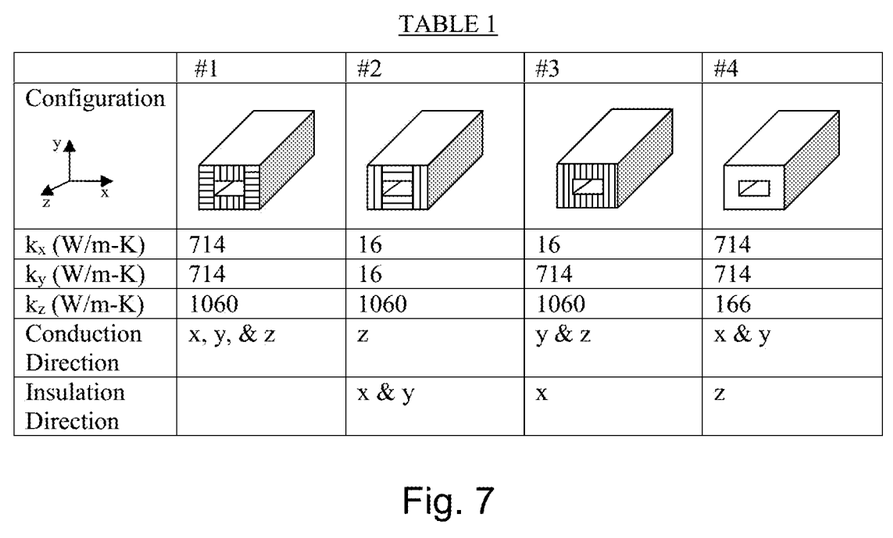
FIG. 7 depicts Table 1 described in the Examples and the four TPG configurations for evaluating thermal conductivity.

Thermal conductivity of four TPG configurations (Configurations 1-4) were calculated with results provided in Table 1, which are shown in FIG. 7.

For configurations 1-4 in Table 1, it was assumed that inner layer and outer layer were made of copper, the inner tube had dimensions of 8×5 mm, the outer tuber had dimensions of 13×10 mm, the thickness of the each of the inner layer and the outer layer was 0.5 mm, the thickness of the TPG layer was 1.5 mm. The thermal conductivity of the TPG was 1500 W/m-K in plane and 10 W/m-K through plane. The thermal conductivity of the copper was 400 W/m-k.

Table 1 (FIG. 7) shows the thermal conductivity calculation for four different TPG configurations (Configurations 1-4) and provides calculations for the thermal conductivity in each direction (x, y, or z).

Embodiments of the technology have been described above and modifications and alterations may occur to others upon the reading and understanding of this specification. The claims as follows are intended to include all modifications and alterations insofar as they come within the scope of the claims or the equivalent thereof.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a thermal management assembly. Modifications may occur to those skilled in the art and to those who may make and use the invention. The disclosed embodiments are merely for illustrative purposes and not intended to limit the scope of the invention or the subject matter set forth in the claims.

What is claimed is:

1. A non-cylindrical tubular structure comprising (i) an inner layer defining a core lumen, (ii) an outer layer, and (iii) a thermally conductive layer disposed between the inner layer and the outer layer, the inner and outer layer individually comprising a metal, a ceramic, a glass, or a plastic, and the thermally conductive layer comprising a thermally conductive material, wherein the non-cylindrical tubular structure is generally rectangular, and
the tubular structure has a center tube axis running along the long axis of the tubular structure, tube side surfaces, a tube top surface, and a tube bottom surface defined by the outer layer; where the thermally conductive material is selected from thermal pyrolytic graphite (TPG), the thermally conductive material being provided as one or more sheets of TPG adjacent each of the tube side surfaces, the tube top surface, and the tube bottom surface, each of the one or more TPG sheet having a plurality of basal planes, wherein the TPG basal planes of the respective sheets are oriented parallel to, perpendicular to, or at an angle to the center tube axis and parallel to, perpendicular to, or at an angle relative to a side surface.

2. The non-cylindrical tubular structure of claim 1, wherein the inner layer and the outer layer each comprise a metal chosen from copper, aluminum, tungsten, molybdenum, nickel, iron, tin, silver, gold, beryllium, titanium, zirconium, or an alloy of two or more thereof.

3. The non-cylindrical tubular structure of claim 1, wherein the non-cylindrical tubular structure comprises three or more sides.

4. The non-cylindrical tubular structure of claim 1, wherein the shape of the tubular structure is generally rectangular.

5. A method of transporting a material comprising passing a material through the non-cylindrical tubular structure of claim 1.

6. The non-cylindrical tubular structure of claim 1, wherein the TPG basal planes are parallel to the center tube axis and parallel to each tube side surface, and perpendicular to the tube top surface and the tube bottom surface.

7. The non-cylindrical tubular structure of claim 1, wherein the TPG basal planes are parallel to the center tube axis and perpendicular to one pair of the tube side surfaces.

8. The non-cylindrical tubular structure of claim 1, wherein the TPG basal planes are parallel to the center tube axis and parallel to each tube side surface, and parallel to the tube top surface and the tube bottom surface.

9. The non-cylindrical tubular structure of claim 1, wherein the TPG basal planes are perpendicular to the center tube axis.

10. The non-cylindrical tubular structure of claim 1, wherein the TPG basal planes are parallel to each other.

11. The non-cylindrical tubular structure of claim 1, wherein the thermally conductive layer is formed from:
   a first sheet defining a side wall, a portion of a top wall, and a portion of a bottom wall;
   a second sheet opposite the first sheet, the second sheet defining a side wall, a portion of the top wall, and a portion of the bottom wall;
   a third sheet disposed in between the first and the second sheet, the third sheet defining a portion of the bottom wall; and
   a fourth sheet opposite the third sheet and disposed between the first sheet and the second sheet, with the center tube being disposed between the first, second, third, and fourth sheets.

12. The non-cylindrical tubular structure of claim 11, wherein the basal planes of the first sheet and the second sheet are oriented in the same direction, and the basal planes of the third sheet and the fourth sheet are oriented in a direction different from that of the first and second sheets.

13. The non-cylindrical tubular structure of claim 11, wherein the basal planes of the first and second sheet are oriented perpendicular to the center tube axis.

14. The non-cylindrical tubular structure of claim 11, wherein the basal planes of the first and second sheet are oriented parallel to the center tube axis.

15. The non-cylindrical tubular structure of claim 11, wherein the basal planes of the first sheet, the second sheet, the third sheet, and the fourth sheet are oriented in the same direction.

* * * * *